United States Patent
Barthelet et al.

(10) Patent No.: US 10,087,774 B2
(45) Date of Patent: Oct. 2, 2018

(54) TURBOCHARGER VARIABLE-VANE CARTRIDGE WITH NOZZLE RING AND PIPE SECURED BY TWO-PIECE SELF-CENTERING SPACERS

(71) Applicant: Honeywell International Inc., Morristown, NJ (US)

(72) Inventors: Pierre Barthelet, Thaon les Vosges (FR); Nicolas Morand, Vosges (FR); Emmanuel Severin, Thaon les Vosges (FR); Calogero Beltrami, Thaon les Vosges (FR); Vincent Eumont, Thaon les Vosges (FR); Francis Abel, La Baffe (FR); Arnaud Gerard, Epinal (FR); Aurelien Tingaud, Thaon les Vosges (FR); Jayavenkateshwaran Krishnamoorthy, Karnataka (IN)

(73) Assignee: Honeywell International Inc., Morris Plains, NJ (US)

(*) Notice: Subject to any disclaimer, the term of this patent is extended or adjusted under 35 U.S.C. 154(b) by 802 days.

(21) Appl. No.: 14/499,730

(22) Filed: Sep. 29, 2014

(65) Prior Publication Data

US 2016/0090858 A1    Mar. 31, 2016

(51) Int. Cl.
*F01D 17/16* (2006.01)
*F01D 9/04* (2006.01)
(Continued)

(52) U.S. Cl.
CPC .............. *F01D 17/16* (2013.01); *F01D 9/048* (2013.01); *F01D 17/165* (2013.01); *F02C 6/12* (2013.01);
(Continued)

(58) Field of Classification Search
CPC ........ F01D 17/16; F01D 9/048; F01D 17/165; F02C 6/12; F02B 37/24; F05D 2250/51;
(Continued)

(56) References Cited

U.S. PATENT DOCUMENTS 3,973,349 A * 8/1976 England ................ A01K 91/20
43/4
4,770,603 A    9/1988 Engels et al.
(Continued)

FOREIGN PATENT DOCUMENTS

WO    2004027218 A1    4/2004
WO    2013151802 A1    10/2013

*Primary Examiner* — Devon Kramer
*Assistant Examiner* — Christopher Brunjes
(74) *Attorney, Agent, or Firm* — John C. James

(57) ABSTRACT

A variable-nozzle turbocharger includes a variable vane mechanism that has an annular nozzle ring supporting an array of rotatable vanes, an insert having a tubular portion sealingly received into a bore of the turbine housing and having a nozzle portion extending radially out from one end of the tubular portion and being axially spaced from the nozzle ring with the vanes therebetween, and a plurality of two-piece self-centering spacer assemblies connected between the nozzle portion of the insert and the nozzle ring. Each spacer assembly comprises a tubular sleeve and a separate pin that passes through the through-passage of the sleeve, end portions of the pin being secured respectively to the nozzle ring and the nozzle portion. One end of each sleeve has a conical surface and engages in a corresponding conical countersink in the adjacent face of the nozzle ring or nozzle portion.

4 Claims, 3 Drawing Sheets

(51) Int. Cl.
*F02C 6/12* (2006.01)
*F02B 37/24* (2006.01)

(52) U.S. Cl.
CPC .......... *F02B 37/24* (2013.01); *F05D 2220/40* (2013.01); *F05D 2230/642* (2013.01); *F05D 2250/51* (2013.01); *F05D 2260/30* (2013.01); *F05D 2260/31* (2013.01)

(58) Field of Classification Search
CPC .......... F05D 2230/642; F05D 2260/30; F05D 2260/31; F05D 2220/40; F04D 29/46; F04D 29/462; F04D 29/54; F04D 29/544; F04D 29/56; F04D 29/563
See application file for complete search history.

(56) References Cited

U.S. PATENT DOCUMENTS

| | | | | |
|---|---|---|---|---|
| 8,333,556 | B2* | 12/2012 | Hettinger | F01D 17/165 415/165 |
| 2002/0036460 | A1* | 3/2002 | Takenaka | H01J 9/185 313/495 |
| 2003/0115763 | A1* | 6/2003 | Prieschl | G01C 17/04 33/333 |
| 2013/0078083 | A1* | 3/2013 | Barthelet | F02C 6/12 415/167 |
| 2014/0169947 | A1* | 6/2014 | Tashiro | F02B 37/24 415/146 |

* cited by examiner

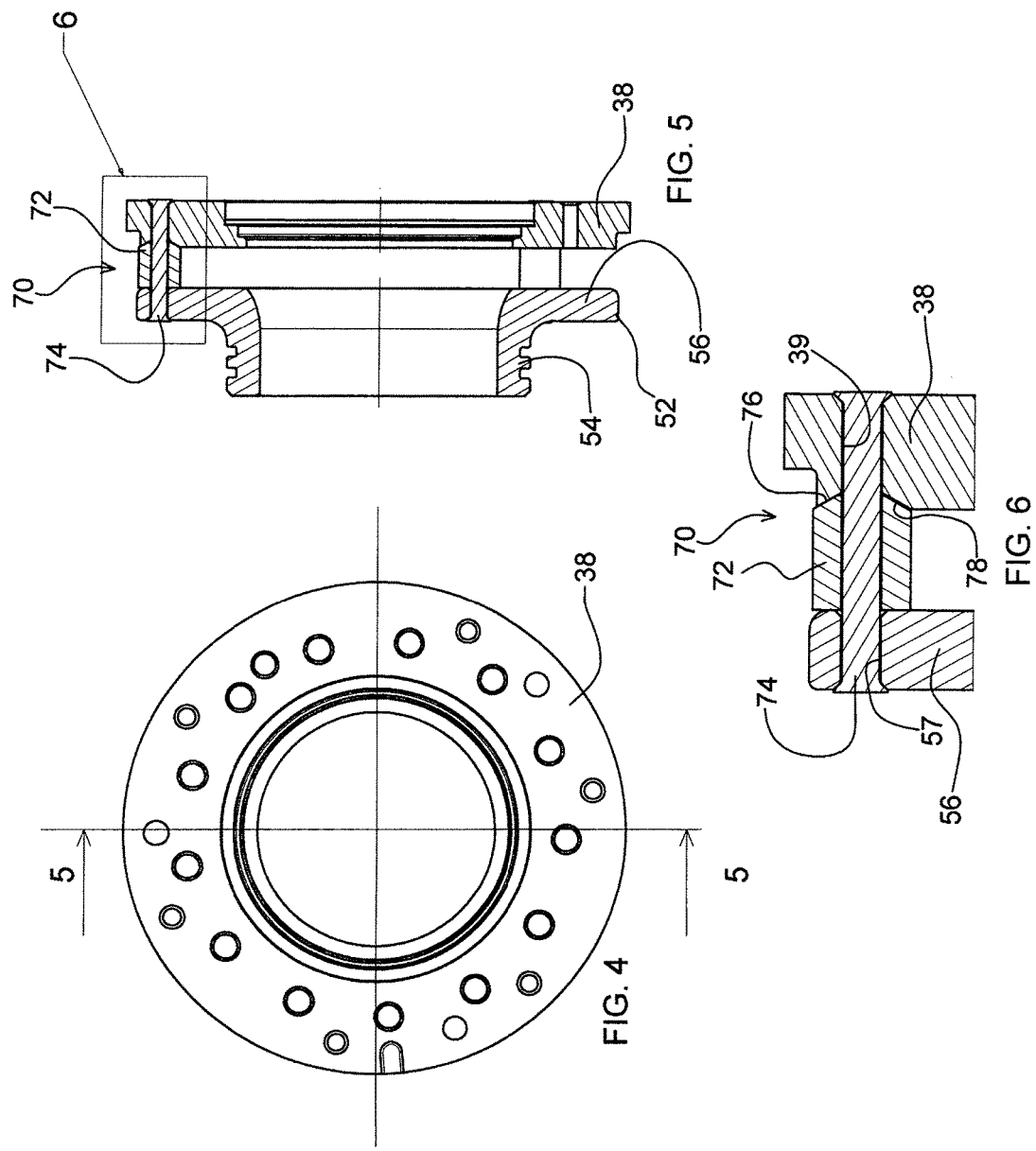

TURBOCHARGER VARIABLE-VANE CARTRIDGE WITH NOZZLE RING AND PIPE SECURED BY TWO-PIECE SELF-CENTERING SPACERS

BACKGROUND OF THE INVENTION

The present invention relates to turbochargers having a variable-nozzle turbine in which an array of movable vanes is disposed in the nozzle of the turbine for regulating exhaust gas flow into the turbine.

An exhaust gas-driven turbocharger is a device used in conjunction with an internal combustion engine for increasing the power output of the engine by compressing the air that is delivered to the air intake of the engine to be mixed with fuel and burned in the engine. A turbocharger comprises a compressor wheel mounted on one end of a shaft in a compressor housing and a turbine wheel mounted on the other end of the shaft in a turbine housing. Typically the turbine housing is foamed separately from the compressor housing, and there is yet another center housing connected between the turbine and compressor housings for containing bearings for the shaft. The turbine housing defines a generally annular chamber that surrounds the turbine wheel and that receives exhaust gas from an engine. The turbine assembly includes a nozzle that leads from the chamber into the turbine wheel. The exhaust gas flows from the chamber through the nozzle to the turbine wheel and the turbine wheel is driven by the exhaust gas. The turbine thus extracts power from the exhaust gas and drives the compressor. The compressor receives ambient air through an inlet of the compressor housing and the air is compressed by the compressor wheel and is then discharged from the housing to the engine air intake.

One of the challenges in boosting engine performance with a turbocharger is achieving a desired amount of engine power output throughout the entire operating range of the engine. It has been found that this objective is often not readily attainable with a fixed-geometry turbocharger, and hence variable-geometry turbochargers have been developed with the objective of providing a greater degree of control over the amount of boost provided by the turbocharger.

One type of variable-geometry turbocharger is the variable-nozzle turbocharger (VNT), which includes an array of variable vanes in the turbine nozzle. The vanes are pivotally mounted to a nozzle ring, which forms one wall of the nozzle. The opposite wall of the nozzle is formed by a pipe or insert that fits into an axial bore of the turbine housing. The vanes are connected to a mechanism that enables the setting angles of the vanes to be varied. Changing the setting angles of the vanes has the effect of changing the effective flow area in the turbine nozzle, and thus the flow of exhaust gas to the turbine wheel can be regulated by controlling the vane positions. In this manner, the power output of the turbine can be regulated, which allows engine power output to be controlled to a greater extent than is generally possible with a fixed-geometry turbocharger.

The axial spacing between the nozzle ring and the insert is maintained by several spacers that are connected between these parts. Because the variable vane mechanism is located between the turbine housing, which gets quite hot because of its exposure to exhaust gases, and the center housing, which is at a much lower temperature than the turbine housing, the variable vane mechanism is subject to thermal stresses because of this temperature gradient. Differential thermal deformations between the nozzle ring and the pipe or insert can result in undesirable changes in the geometry of the nozzle. In fact, in some cases it has been observed that the spacers develop cracks because of the resulting stresses.

BRIEF SUMMARY OF THE DISCLOSURE

The present invention addresses the above-noted issue by providing a variable-nozzle turbocharger having a variable-nozzle turbine in which two-piece, self-centering spacers are employed for spacing the nozzle ring from the insert. In one embodiment described herein, the turbocharger comprises:

a turbine assembly comprising a turbine housing and a turbine wheel mounted in the turbine housing and connected to a rotatable shaft for rotation therewith, the turbine housing defining a chamber surrounding the turbine wheel for receiving exhaust gas and for supplying the exhaust gas to the turbine wheel, the turbine assembly defining a nozzle leading from the chamber generally radially inwardly to the turbine wheel, the turbine housing further defining an axially extending bore through which exhaust gas is discharged after passing through the turbine wheel;

a compressor assembly comprising a compressor housing and a compressor wheel mounted in the compressor housing and connected to the rotatable shaft for rotation therewith;

a center housing connected between the compressor housing and the turbine housing;

a generally annular nozzle ring and an array of vanes circumferentially spaced about the nozzle ring and disposed in the nozzle such that exhaust gas flows between the vanes to the turbine wheel, each vane being rotatably mounted to the nozzle ring and connected to a rotatable actuator ring such that rotation of the actuator ring rotates the vanes for regulating exhaust gas flow to the turbine wheel;

an insert having a tubular portion sealingly received into the bore of the turbine housing and having a nozzle portion extending generally radially out from one end of the tubular portion, the nozzle portion being axially spaced from the nozzle ring such that the vanes extend between the nozzle ring and the nozzle portion; and a plurality of spacers connected between the nozzle portion of the insert and the nozzle ring for securing the nozzle ring to the insert and maintaining an axial spacing between the nozzle portion of the insert and the nozzle ring;

wherein each of the spacers comprises a two-piece self-centering assembly comprising a tubular sleeve and a pin, each sleeve defining a through-passage and each corresponding pin passing through the through-passage, each pin having a first end portion that projects from a first end of the sleeve and passes through an aperture defined by the nozzle ring and having a second end portion that projects from an opposite second end of the sleeve and passes through an aperture defined in the nozzle portion of the insert, the first end of each pin being secured to the nozzle ring and the second end of each pin being secured to the nozzle portion of the insert;

wherein the pins are secured to the nozzle ring and the nozzle portion so as to draw the nozzle ring and the nozzle portion axially toward each other so that the first ends of the sleeves bear against a face of the nozzle ring and the second ends of the sleeves bear against a face of the nozzle portion, the sleeves keeping the nozzle ring and the nozzle portion spaced apart, and wherein one of the first and second ends of each sleeve forms a conical surface that is coaxial with the through-passage of the sleeve, and the face against which the one end of each sleeve bears defines a corresponding conical countersink that is coaxial with the aperture through which the end portion of the pin passes, such that engagement between the conical surfaces of the sleeves and the conical countersinks maintains the through-passages of the sleeves coaxial with the apertures for the pins, whereby the self-centering assemblies maintain the sleeves substantially coaxial with the corresponding pins.

In one embodiment, the conical countersinks are defined in the face of the nozzle ring and the first ends of the sleeves define the conical surfaces that engage in the countersinks. It is equally effective, however, for the conical countersinks to be defined in the face of the nozzle portion of the insert, and for the second ends of the sleeves to define the conical surfaces.

The two-piece, self-centering spacer assemblies eliminate cracking problems seen in prior-art one-piece spacers having shoulders that perform the function of spacing the nozzle ring from the insert. In those prior-art arrangements, cracking was seen in the region of the shoulders where they join with the cylindrical pin portion of the spacer. The cracking is believed to result from cyclic flexion of the pins caused by thermal deformations, and the juncture between the shoulders and the cylindrical pin portion acted as stress concentrators. With the two-piece spacers, the sleeves perform the spacing function and are generally in compression between the nozzle ring and the insert, whereas the pins are generally in tension. The pins, which can be substantially cylindrical except for their end portions that are secured to the nozzle ring and the insert, can undergo flexion without the stress concentration and cracking problem seen in the prior-art one-piece spacers. Additionally, the self-centering action of the sleeves serves to keep the proper relative positions and orientations of the nozzle ring and the insert even when thermal effects tend to cause thermal deformations of the parts.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 4 is an axial end view of the subassembly of FIG. 2;

FIG. 5 is a cross-sectional view along line 5-5 in FIG. 4; and

FIG. 6 is a magnified view of a portion of FIG. 5.

DETAILED DESCRIPTION OF THE DRAWINGS

The present inventions now will be described more fully hereinafter with reference to the accompanying drawings, in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
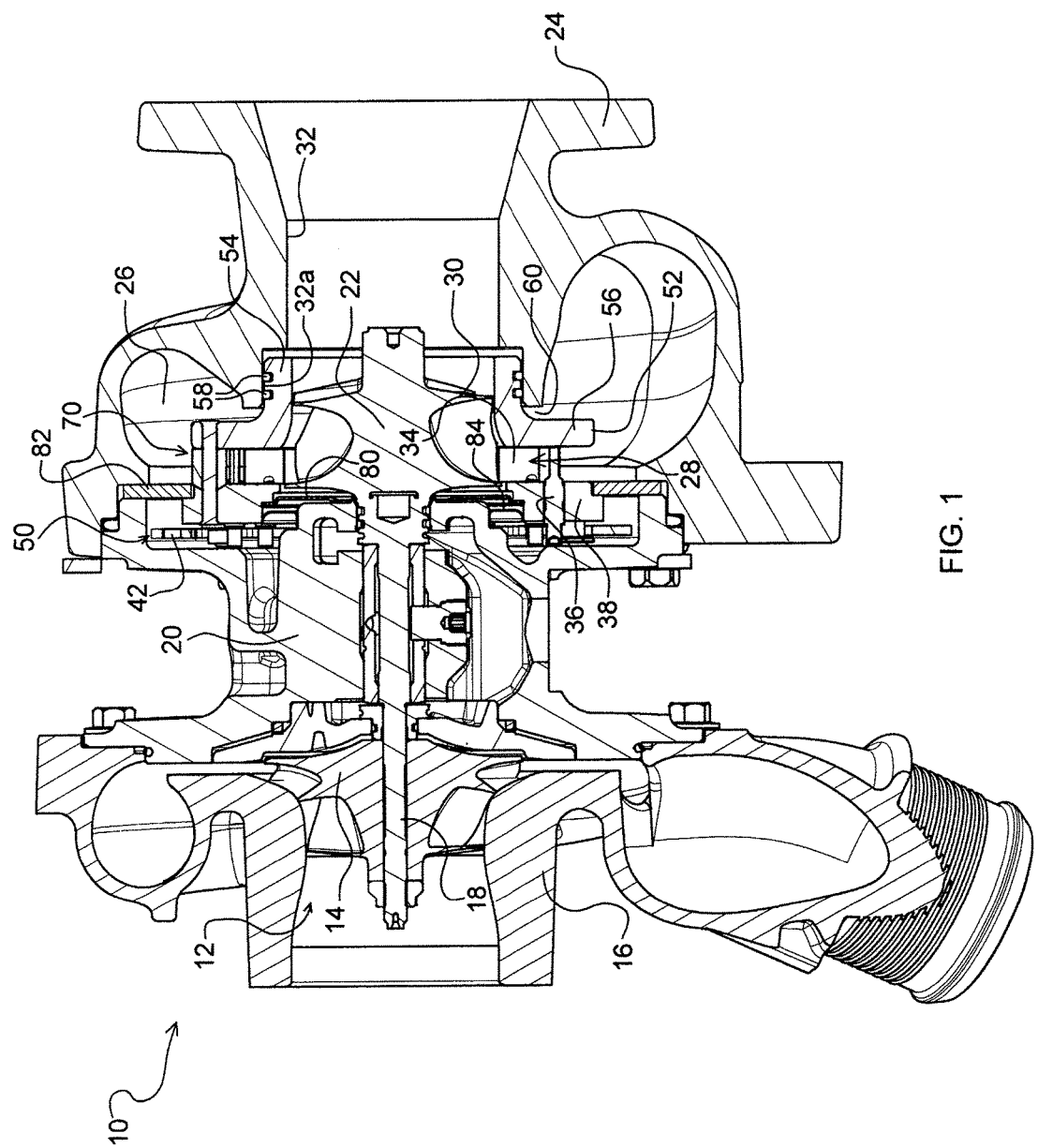
FIG. 1 is a cross-sectional view of a turbocharger in accordance with one embodiment of the invention.
Figure 3:
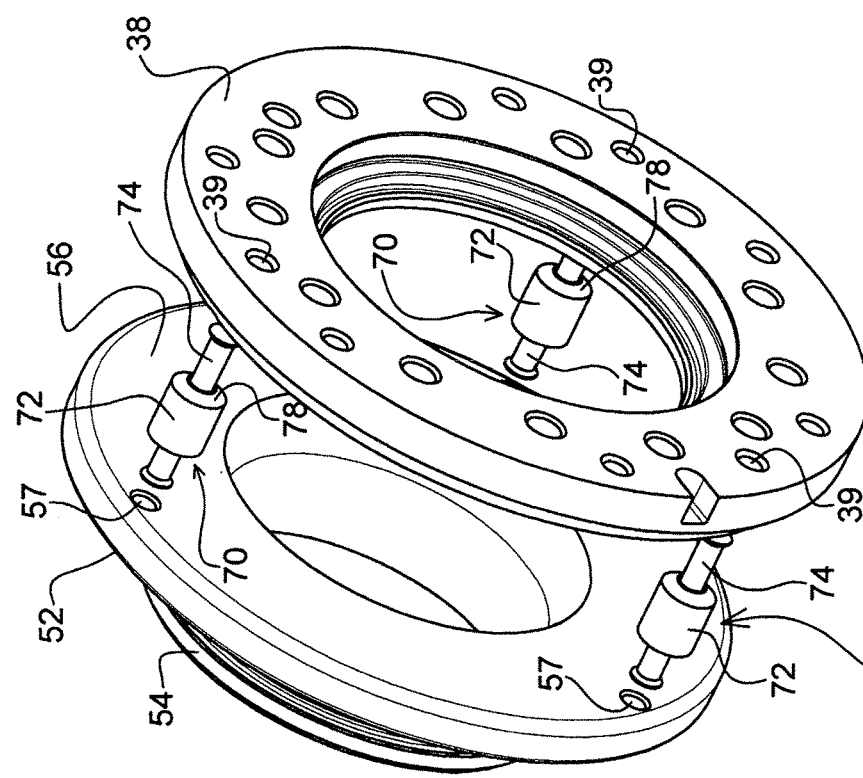
FIG. 3 is another exploded view of the subassembly of FIG. 2.

A turbocharger 10 in accordance with one embodiment of the invention is illustrated in cross-sectional view in FIG. 1. The turbocharger comprises a compressor 12 having a compressor wheel or impeller 14 mounted in a compressor housing 16 on one end of a rotatable shaft 18. The shaft is supported in bearings (not specifically illustrated) mounted in a center housing 20 of the turbocharger. The shaft 18 is rotated by a turbine wheel 22 mounted on the other end of the shaft 18 from the compressor wheel, thereby rotatably driving the compressor wheel, which compresses air drawn in through the compressor inlet and delivers the compressed air to the intake of an internal combustion engine (not shown) for boosting the performance of the engine.

The turbocharger also includes a turbine housing 24 that houses the turbine wheel 22. The turbine housing defines a generally annular chamber 26 that surrounds the turbine wheel and that receives exhaust gas from the internal combustion engine for driving the turbine wheel. The exhaust gas is directed from the chamber 26 generally radially inwardly through a turbine nozzle 28 to the turbine wheel 22. As the exhaust gas flow through the passages between the blades 30 of the turbine wheel, the gas is expanded to a lower pressure, and the gas discharged from the wheel exits the turbine housing through a generally axial bore 32 therein.

The turbine nozzle 28 is a variable nozzle for varying the cross-sectional flow area through the nozzle so as to regulate flow into the turbine wheel. The nozzle includes a plurality of vanes 34 that are circumferentially spaced about the nozzle. Each vane is affixed to an axle 36 that passes through an aperture in a generally annular nozzle ring 38 that is mounted coaxially with respect to the turbine wheel 22. Each axle 36 is rotatable about its axis for rotating the attached vane. The nozzle ring 38 forms one wall of the flow passage of the nozzle 28. Each of the axles 36 has a vane arm (not specifically illustrated) affixed to an end of the axle that protrudes out from the nozzle ring 38, and is engaged by a generally annular unison ring 42 (also referred to herein as an actuator ring) that is rotatable about its axis and that is coaxial with the nozzle ring 38. An actuator (not shown) is connected to the unison ring 42 for rotating it about its axis. When the unison ring is rotated, the vane arms are rotated to cause the axles 36 to rotate about their axes, thereby rotating the vanes 34 so as to vary the cross-sectional flow area through the nozzle 28. As described thus far, the variable nozzle mechanism generally corresponds to a conventional variable nozzle having variable vanes.

Figure 2:
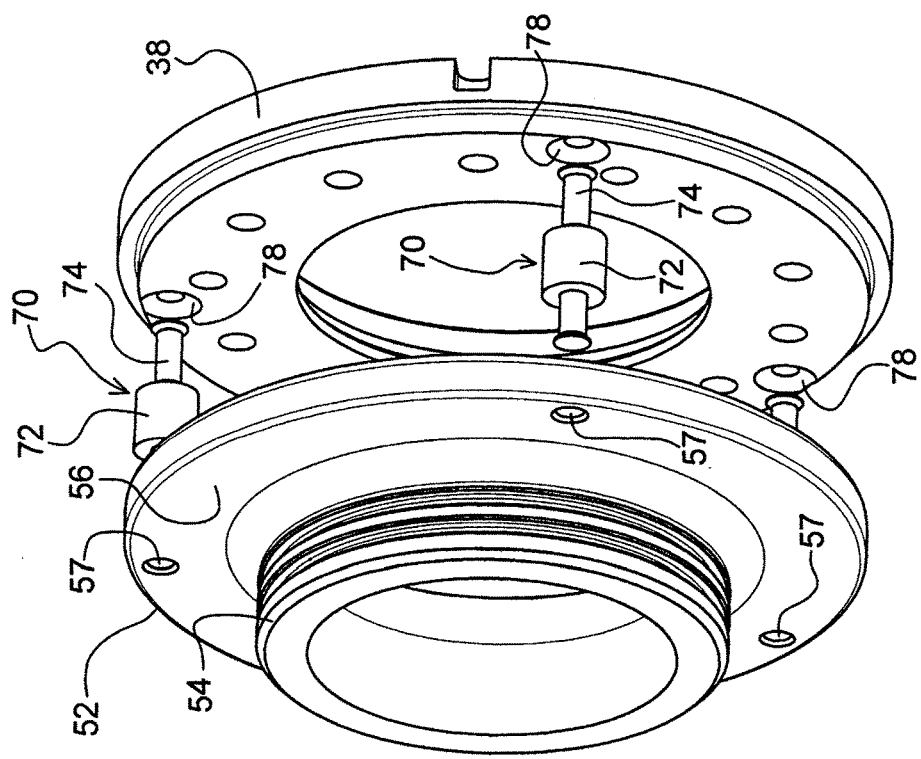
FIG. 2 is an exploded view of a subassembly of a variable vane cartridge for the turbocharger in accordance with one embodiment of the invention.

In the illustrated embodiment, the variable vane mechanism is provided in the form of a cartridge 50 that is installable into and removable from the turbocharger as a unit. The cartridge 50 comprises the nozzle ring 38, vanes 34, axles 36, vane arms, and unison ring 42. The cartridge further comprises an insert 52 (better seen in FIG. 2) that has a tubular portion 54 sealingly received into a portion 32a of the bore 32 of the turbine housing, and a nozzle portion 56 extending generally radially out from one end of the tubular portion 54, the nozzle portion 56 being axially spaced from the nozzle ring 38 such that the vanes 34 extend between the nozzle ring 38 and the nozzle portion 56. The bore portion 32a of the turbine housing has a radius that exceeds that of the remainder of the bore 32 by an amount slightly greater than the radial thickness of the tubular portion 54 of the insert 52. The radially outer surface of the tubular portion 54 has at least one circumferential groove, and preferably has two axially spaced grooves as shown in FIG. 1, in each of which a sealing ring 58 is retained for sealingly engaging the inner surface of the bore portion 32a. Advantageously, the outer diameter of the tubular portion 54 of the insert is slightly less than the inner diameter of the bore portion 32a so that a slight gap is defined therebetween, and only the sealing rings 58 make contact with the inner surface of the bore portion 32a. Additionally, there is a gap 60 between the nozzle portion 56 and the adjacent end of the turbine housing at the end of the bore portion 32a. In this manner, the insert 52 is mechanically and thermally decoupled from the turbine housing 24.

The cartridge 50 further comprises a heat shroud 80 that is captively retained between the nozzle ring 38 and the center housing 20 when the cartridge is installed onto the center housing. The heat shroud 80 provides sealing between the nozzle ring and center housing to prevent hot exhaust gas from migrating between these parts into the cavity in which the vane arms and unison ring 42 are disposed. The heat shroud 80 advantageously is a resiliently elastic material such as spring steel or the like, and the shroud is configured so that it is compressed in the axial direction between the nozzle ring 38 and the center housing 20 so that the restoring force of the shroud urges the nozzle ring axially (to the right in FIG. 1) against a flange or retainer 82 that is sandwiched between the center housing and the turbine housing, thereby axially locating the nozzle ring (and thus the entire variable nozzle cartridge 50) within the turbocharger. In this regard the cartridge 50 is axially located in substantially the same way described in commonly owned U.S. Pat. No. 8,333,556, the entire disclosure of which is hereby incorporated herein by reference. The cartridge is radially located by a locator ring 84 whose radially outer periphery engages a radially inwardly facing surface of the nozzle ring 38 and whose radially inner periphery engages a radially outwardly facing surface of the center housing 20.

A plurality of two-piece, self-centering spacer assemblies 70 are connected between the nozzle ring 38 and the nozzle portion 56 of the insert 52 for securing the nozzle ring to the insert and maintaining the desired axial spacing between the nozzle portion of the insert and the nozzle ring. Referring particularly to FIGS. 2-6, each two-piece, self-centering spacer assembly 70 comprises a tubular sleeve 72 and a pin 74. Each sleeve 72 defines a through-passage and each corresponding pin 74 passes through the through-passage. The pins 74 are longer than the sleeves 72, and each pin 74 has a first end portion that projects from a first end of the sleeve and passes through an aperture 39 defined by the nozzle ring 38, and has a second end portion that projects from an opposite second end of the sleeve and passes through an aperture 57 defined in the nozzle portion 56 of the insert 52. The first end of each pin 74 is secured to the nozzle ring 38 and the second end of each pin is secured to the nozzle portion 56 of the insert 52.

The pins 74 are secured to the nozzle ring 38 and the nozzle portion 56 in such a manner that they draw the nozzle ring and the nozzle portion axially toward each other. For example, the ends of the pins 74 can be secured to the nozzle ring and nozzle portion by a process similar to riveting, wherein the ends of the pin are upset to increase in diameter. The result is that the first ends of the sleeves 72 bear against a face of the nozzle ring 38 and the second ends of the sleeves bear against a face of the nozzle portion 56 by virtue of the tension in the pins 74. The sleeves 72 keep the nozzle ring 38 and the nozzle portion 56 spaced apart.

In accordance with the invention, one of the first and second ends of each sleeve 72 forms a conical surface 76 that is coaxial with the through-passage of the sleeve, and the face against which the one end of each sleeve bears defines a corresponding conical countersink 78 that is coaxial with the aperture through which the end portion of the pin passes, such that engagement between the conical surfaces of the sleeves and the conical countersinks maintains the through-passages of the sleeves 72 coaxial with the apertures for the pins 74, whereby the self-centering assemblies maintain the sleeves 72 substantially coaxial with the corresponding pins 74. In the illustrated embodiment, the conical countersinks are in the nozzle ring 38, but alternatively the countersinks could be in the nozzle portion 56 of the insert 52.

From the above description of one embodiment of the invention, it will be understood that the spacer assemblies 70 enables a number of advantages or characteristics to be attained. The sleeves 72 perform the spacing function for the nozzle ring 38 and insert 52 and are generally in compression between the nozzle ring and the insert, whereas the pins 74 are generally in tension. The pins, which can be substantially cylindrical except for their end portions that are secured to the nozzle ring and the insert, can undergo flexion without the stress concentration and cracking problem seen in the prior-art one-piece spacers. Additionally, the self-centering action of the sleeves serves to keep the proper relative positions and orientations of the nozzle ring and the insert even when thermal effects tend to cause thermal deformations of the parts.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A turbocharger having a variable-nozzle turbine, comprising:

a turbine assembly comprising a turbine housing and a turbine wheel mounted in the turbine housing and connected to a rotatable shaft for rotation therewith, the turbine housing defining a chamber surrounding the turbine wheel for receiving exhaust gas and for supplying the exhaust gas to the turbine wheel, the turbine assembly defining a nozzle leading from the chamber generally radially inwardly to the turbine wheel, the turbine housing further defining an axially extending bore through which exhaust gas is discharged after passing through the turbine wheel;

a compressor assembly comprising a compressor housing and a compressor wheel mounted in the compressor housing and connected to the rotatable shaft for rotation therewith;

a center housing connected between the compressor housing and the turbine housing; and a generally annular nozzle ring and an array of vanes circumferentially spaced about the nozzle ring and disposed in the nozzle such that exhaust gas flows between the vanes to the turbine wheel, each vane being rotatably mounted to the nozzle ring and connected to a rotatable actuator ring such that rotation of the actuator ring rotates the vanes for regulating exhaust gas flow to the turbine wheel;

an insert having a tubular portion sealingly received into the bore of the turbine housing and having a nozzle portion extending generally radially out from one end of the tubular portion, the nozzle portion being axially spaced from the nozzle ring such that the vanes extend between the nozzle ring and the nozzle portion; and a plurality of spacers connected between the nozzle portion of the insert and the nozzle ring for securing the nozzle ring to the insert and maintaining an axial spacing between the nozzle portion of the insert and the nozzle ring;

wherein each of the spacers comprises a two-piece self-centering assembly comprising a tubular sleeve and a pin, each sleeve defining a through-passage and each corresponding pin passing through the through-passage, each pin having a first end portion that projects from a first end of the sleeve and passes through an aperture defined by the nozzle ring and having a second end portion that projects from an opposite second end of the sleeve and passes through an aperture defined in the nozzle portion of the insert, the first end of each pin being secured to the nozzle ring and the second end of each pin being secured to the nozzle portion of the insert;

wherein the pins are secured to the nozzle ring and the nozzle portion so as to draw the nozzle ring and the nozzle portion axially toward each other so that the first ends of the sleeves bear against a face of the nozzle ring and the second ends of the sleeves bear against a face of the nozzle portion, the sleeves keeping the nozzle ring and the nozzle portion spaced apart, and wherein one of the first and second ends of each sleeve forms a conical surface that is coaxial with the through-passage of the sleeve, and the face against which the one end of each sleeve bears defines a corresponding conical countersink that is coaxial with the aperture through which the end portion of the pin passes, such that engagement between the conical surfaces of the sleeves and the conical countersinks maintains the through-passages of the sleeves coaxial with the apertures for the pins, whereby the self-centering assemblies maintain the sleeves substantially coaxial with the corresponding pins.

2. The turbocharger of claim 1, wherein the conical countersinks are defined in the face of the nozzle ring and the first ends of the sleeves define the conical surfaces that engage in the countersinks.

3. A variable-nozzle turbine cartridge for a variable-nozzle turbine, the cartridge comprising an assembly of:

a generally annular nozzle ring and an array of vanes circumferentially spaced about the nozzle ring, each vane being rotatably mounted to the nozzle ring and connected to a rotatable actuator ring such that rotation of the actuator ring rotates the vanes for regulating exhaust gas flow therethrough;

an insert having a tubular portion configured for being sealingly received into a bore of a turbine housing and having a nozzle portion extending generally radially out from one end of the tubular portion, the nozzle portion being axially spaced from the nozzle ring such that the vanes extend between the nozzle ring and the nozzle portion; and a plurality of spacers connected between the nozzle portion of the insert and the nozzle ring for securing the nozzle ring to the insert and maintaining an axial spacing between the nozzle portion of the insert and the nozzle ring;

wherein each of the spacers comprises a two-piece self-centering assembly comprising a tubular sleeve and a pin, each sleeve defining a through-passage and each corresponding pin passing through the through-passage, each pin having a first end portion that projects from a first end of the sleeve and passes through an aperture defined by the nozzle ring and having a second end portion that projects from an opposite second end of the sleeve and passes through an aperture defined in the nozzle portion of the insert, the first end of each pin being secured to the nozzle ring and the second end of each pin being secured to the nozzle portion of the insert;

wherein the pins are secured to the nozzle ring and the nozzle portion so as to draw the nozzle ring and the nozzle portion axially toward each other so that the first ends of the sleeves bear against a face of the nozzle ring and the second ends of the sleeves bear against a face of the nozzle portion, the sleeves keeping the nozzle ring and the nozzle portion spaced apart, and wherein one of the first and second ends of each sleeve forms a conical surface that is coaxial with the through-passage of the sleeve, and the face against which the one end of each sleeve bears defines a corresponding conical countersink that is coaxial with the aperture through which the end portion of the pin passes, such that engagement between the conical surfaces of the sleeves and the conical countersinks maintains the through-passages of the sleeves coaxial with the apertures for the pins, whereby the self-centering assemblies maintain the sleeves substantially coaxial with the corresponding pins.

4. The variable-nozzle turbine cartridge of claim 3, wherein the conical countersinks are defined in the face of the nozzle ring and the first ends of the sleeves define the conical surfaces that engage in the countersinks.

* * * * *